(12) United States Patent
Song

(10) Patent No.: US 8,821,150 B2
(45) Date of Patent: Sep. 2, 2014

(54) MANUFACTURING METHOD OF COLOR FILTER SUBSTRATE

(75) Inventor: Tae Joon Song, Suwon-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/868,040

(22) Filed: Aug. 25, 2010

(65) Prior Publication Data

US 2010/0320361 A1 Dec. 23, 2010

Related U.S. Application Data

(63) Continuation of application No. 11/898,048, filed on Sep. 7, 2007, now Pat. No. 7,799,263.

(30) Foreign Application Priority Data

Sep. 7, 2006 (KR) .................. 10-2006-0086254

(51) Int. Cl.
*B29C 59/00* (2006.01)
*G02B 5/20* (2006.01)
(52) U.S. Cl.
CPC ....................................... *G02B 5/201* (2013.01)
USPC ........................................................ 425/385
(58) Field of Classification Search
USPC ........... 264/2.2–2.4, 496, 219–220, 225–227, 264/236, 313, 319; 425/385
See application file for complete search history.

(56) References Cited

U.S. PATENT DOCUMENTS

| 5,817,242 | A | * | 10/1998 | Biebuyck et al. ................ 216/41 |
| 7,645,413 | B2 | | 1/2010 | Song |
| 2002/0100859 | A1 | | 8/2002 | Yagi et al. |
| 2004/0106069 | A1 | * | 6/2004 | Gmur ............................ 430/320 |
| 2004/0135293 | A1 | | 7/2004 | Umeki |
| 2004/0163563 | A1 | * | 8/2004 | Sreenivasan et al. ......... 101/494 |
| 2005/0140915 | A1 | | 6/2005 | Paek et al. |
| 2005/0282402 | A1 | | 12/2005 | Kim |
| 2006/0097414 | A1 | | 5/2006 | Chae et al. |
| 2006/0121815 | A1 | | 6/2006 | Kim et al. |

FOREIGN PATENT DOCUMENTS

| JP | 2005049575 A | * | 2/2005 |
| KR | 10-2006-0044263 | | 5/2006 |

* cited by examiner

*Primary Examiner* — Ryan Ochylski
(74) *Attorney, Agent, or Firm* — McKenna Long & Aldridge

(57) ABSTRACT

A manufacturing method of a color filter substrate includes forming a black matrix on a substrate, the black matrix including first, second, third and fourth openings, forming first, second and third color filter patterns in the first, second and third openings, forming an overcoat layer on the substrate, disposing a soft mold on the organic material layer, the soft mold including first depressed portions and a second depressed portion, the first depressed portions corresponding to the black matrix, and the second depressed portion corresponding to the fourth opening, wherein a first depth of the first depressed portions is larger than a second depth of the second depressed portion, applying pressure to the soft mold such that the first and second depressed portions are filled with the overcoat layer, first curing the overcoat layer, detaching the soft mold from the overcoat layer, and second curing the overcoat layer.

7 Claims, 21 Drawing Sheets

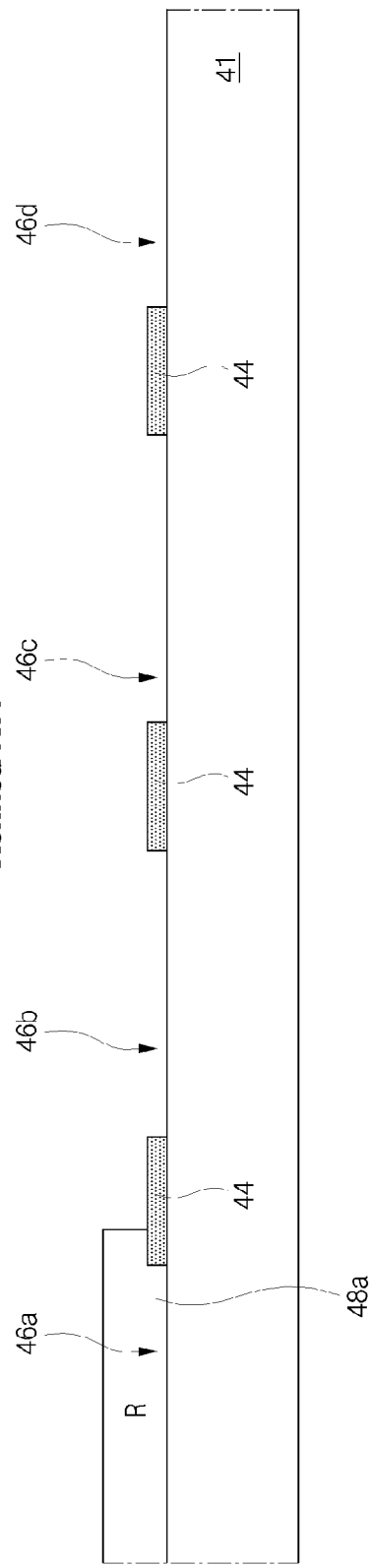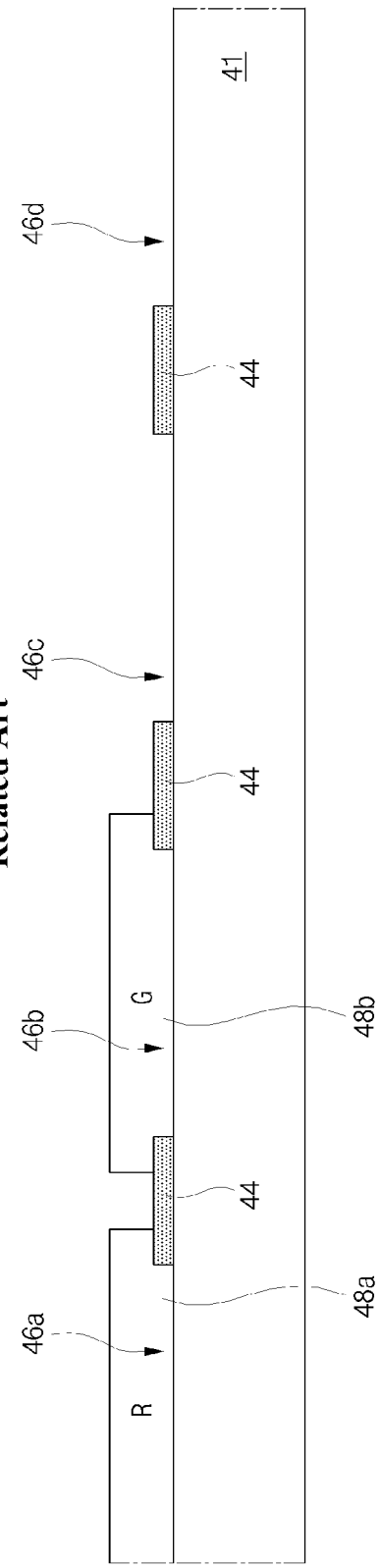

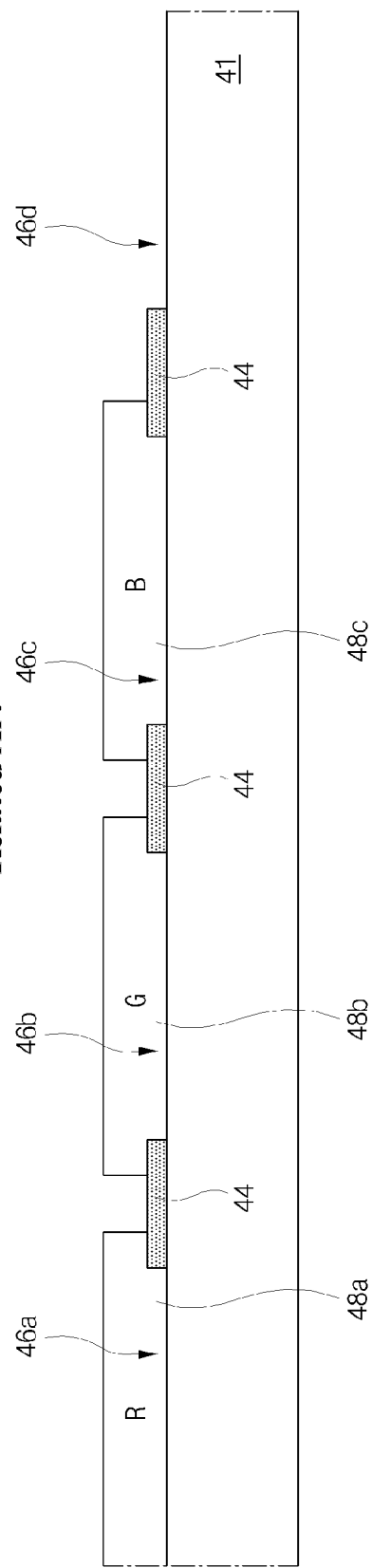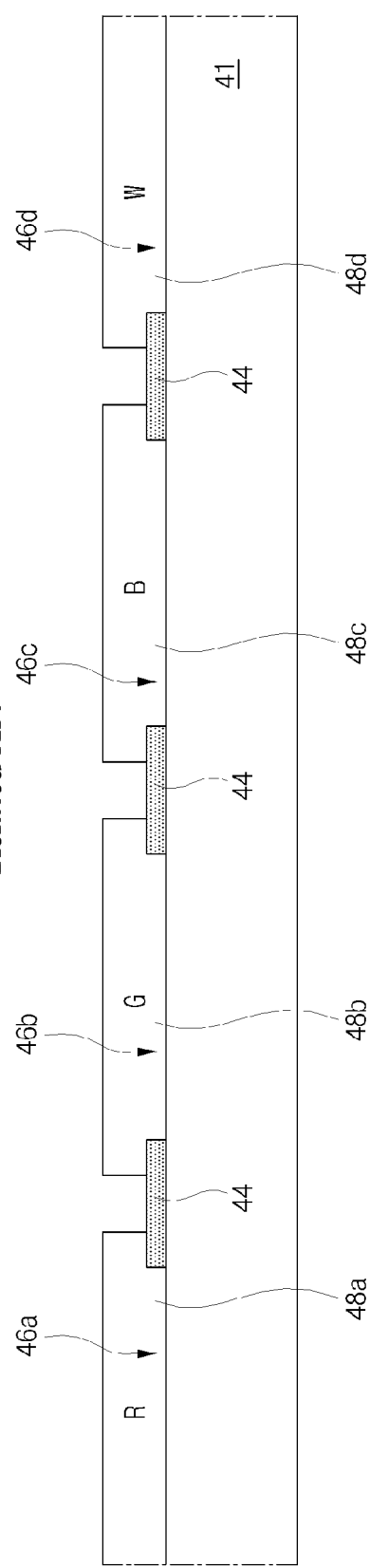

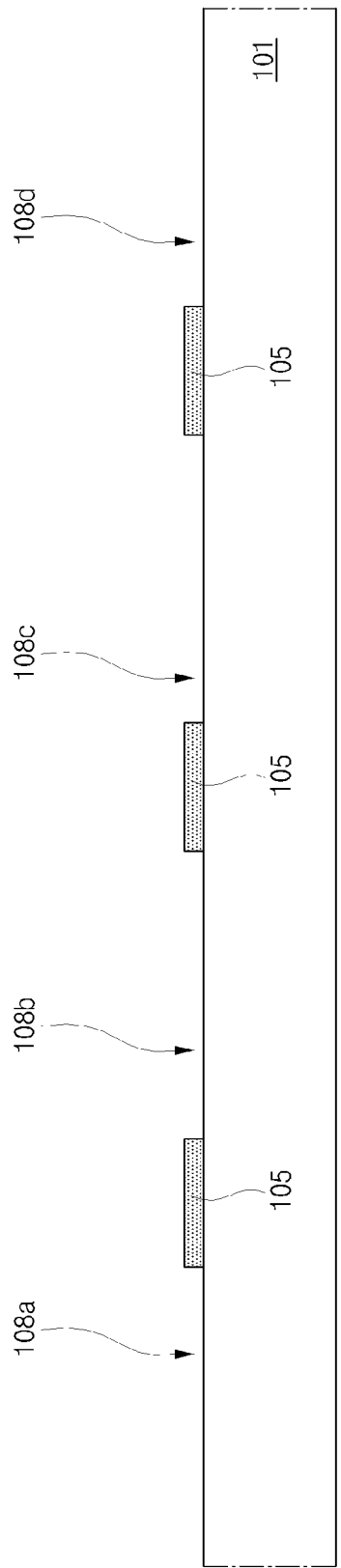
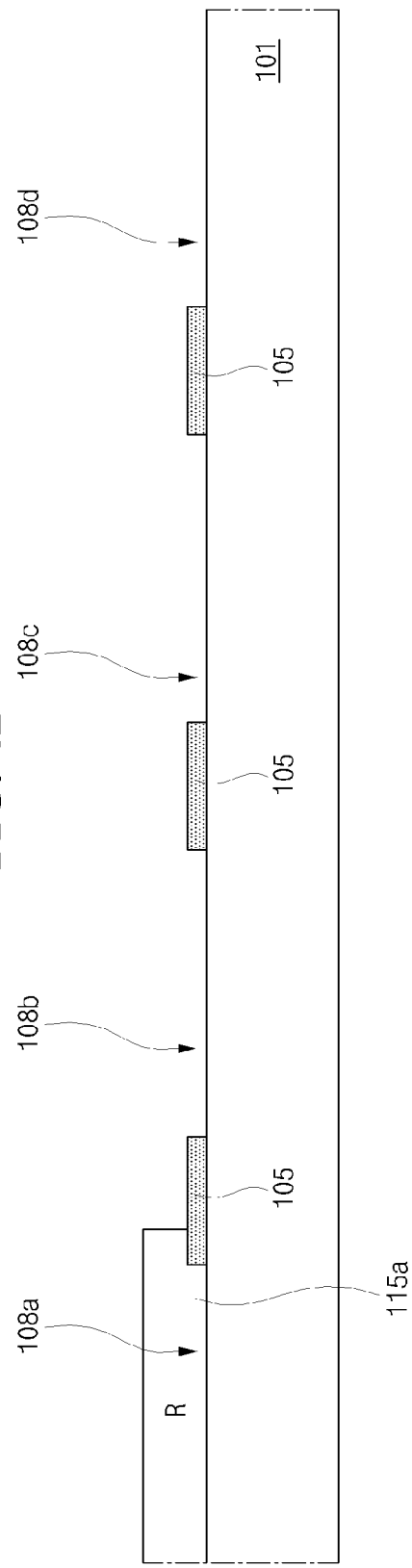

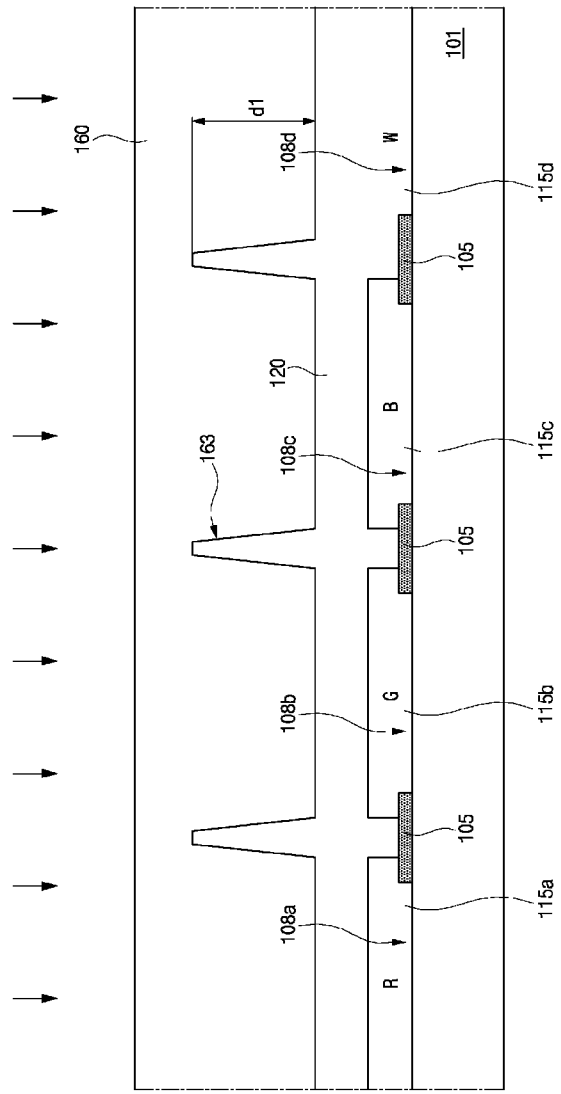

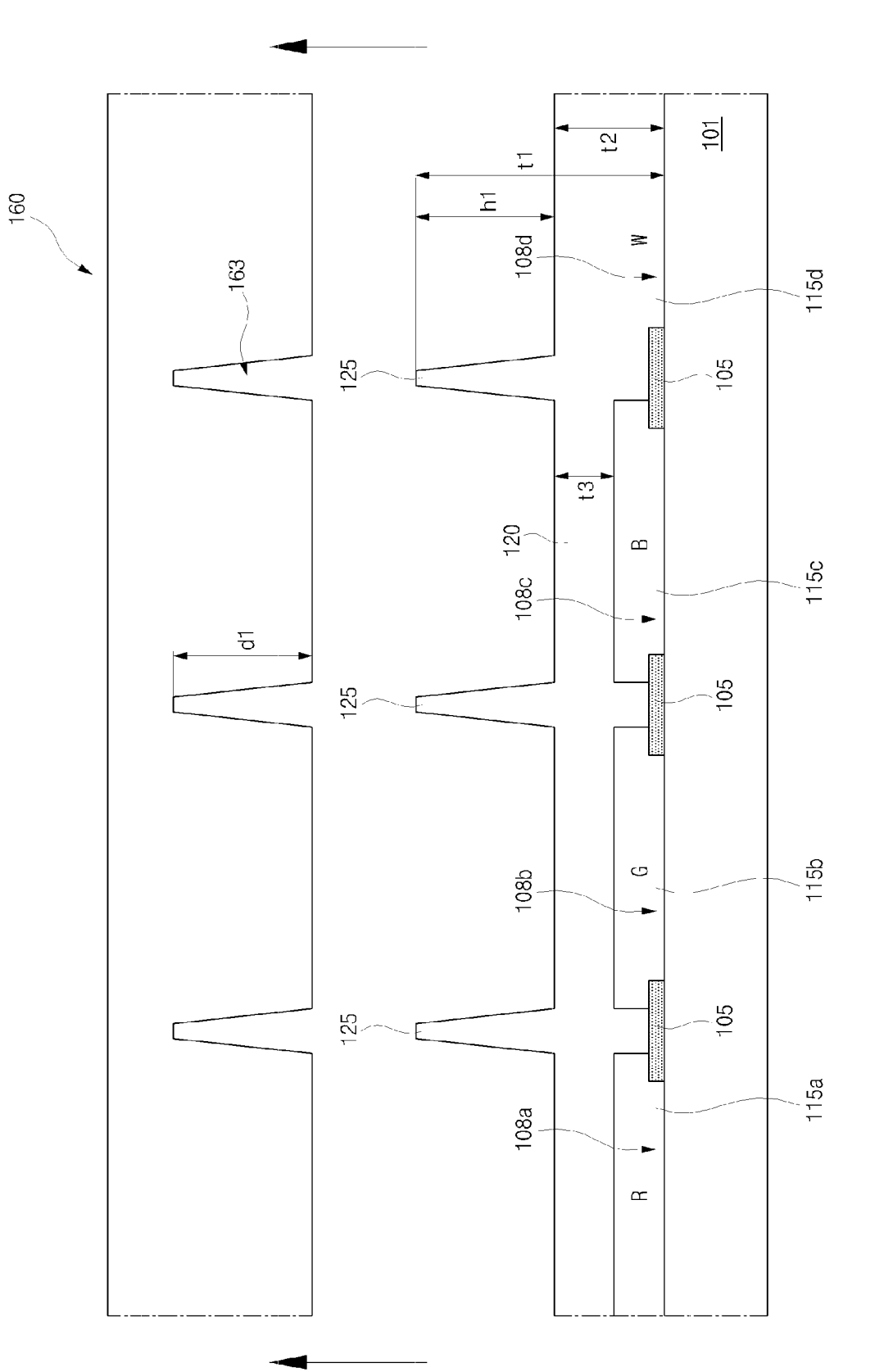

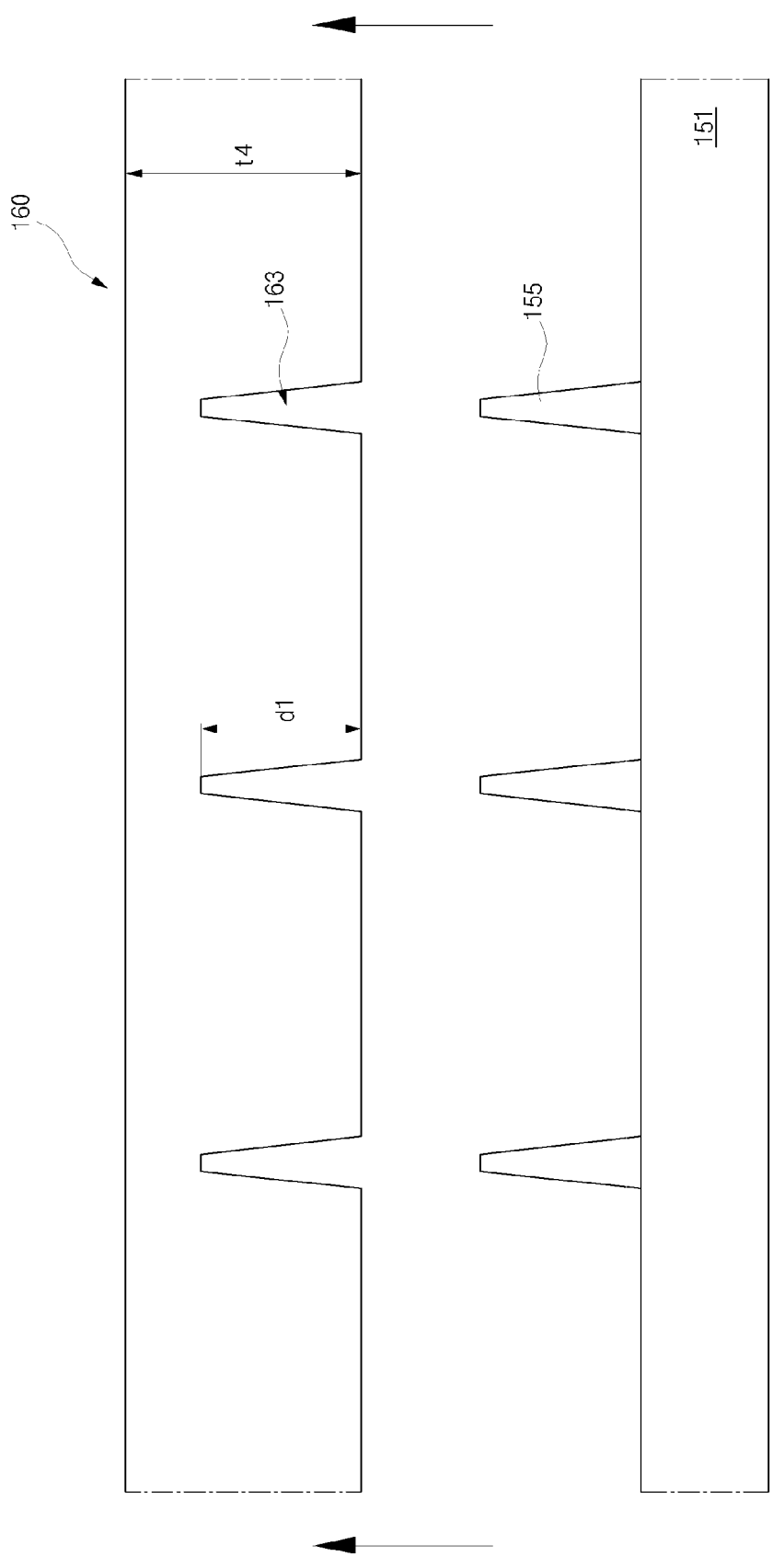

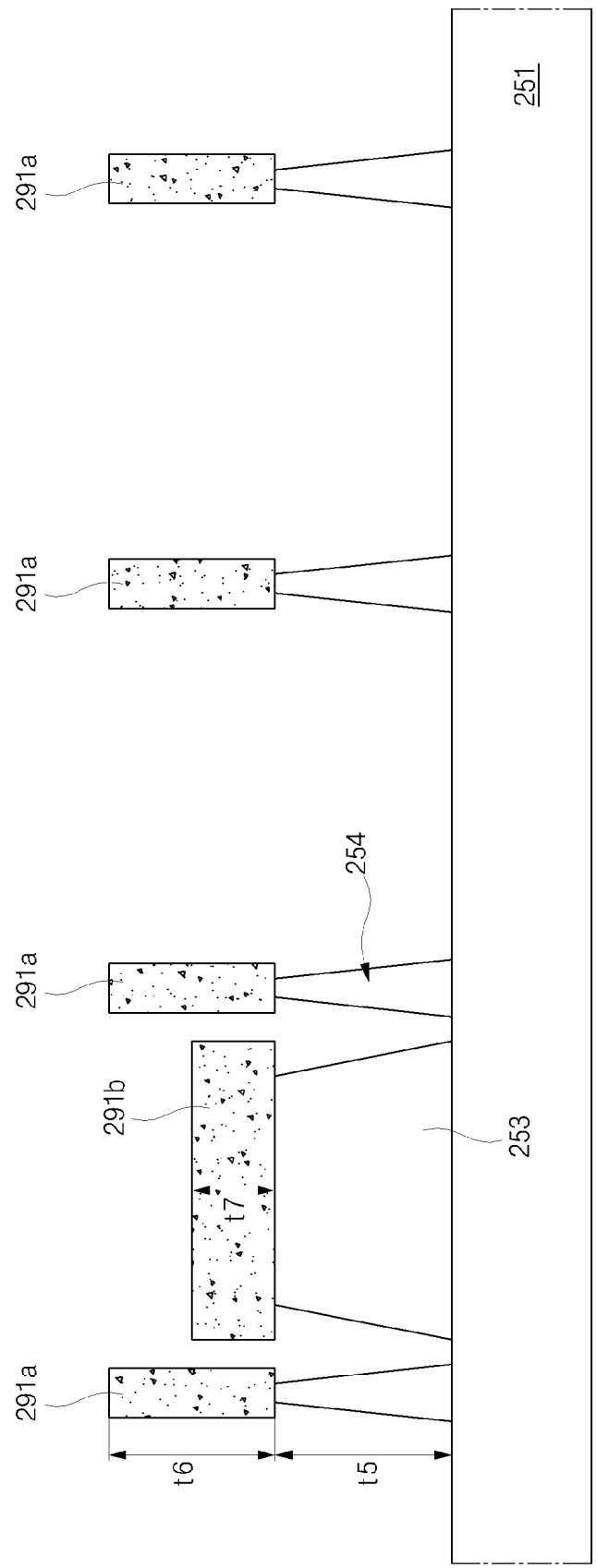

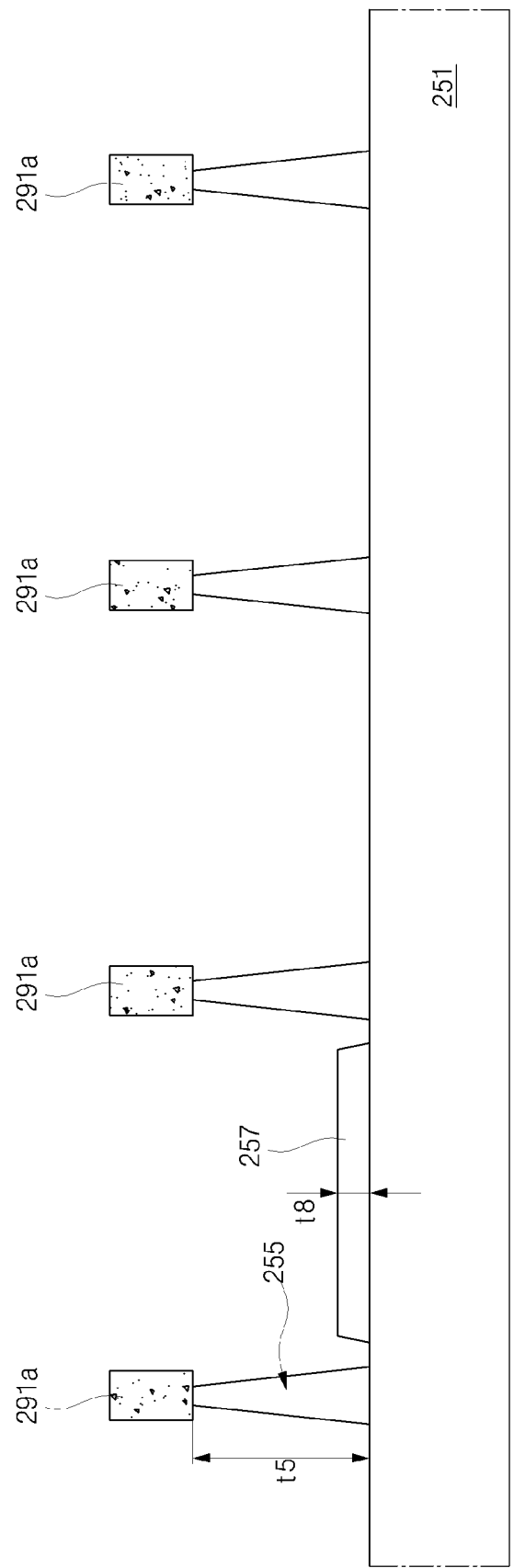

MANUFACTURING METHOD OF COLOR FILTER SUBSTRATE

This is a continuation application of U.S. patent application Ser. No. 11/898,048, filed Sep. 7, 2007 now U.S. Pat. No. 7,799,263, which claims the benefit of Korean Patent Application No. 10-2006-0086254, filed in Korea on Sep. 7, 2006, all of which are hereby incorporated by reference for all purposes as if fully set forth herein.

BACKGROUND OF THE INVENTION

1. Field of the Invention

The present invention relates to a liquid crystal display (LCD) device, and more particularly, to a manufacturing method of a color filter substrate for an LCD device.

2. Discussion of the Related Art

Liquid crystal display (LCD) devices are being developed as the next generation of display devices because they have advantageous characteristics such as light weight, thin profile, and low power consumption.

Active matrix liquid crystal display (AMLCD) devices include thin film transistors as switching devices for a plurality of pixels that independently control the pixels. Active matrix liquid crystal display devices have been widely adopted because of their high resolution and ability to display fast moving images.

In general, an LCD device is completed by manufacturing an array substrate and a color filter substrate and then interposing liquid crystal between the array substrate and the color filter substrate.

FIG. 1 is a perspective view illustrating a related art LCD device. In FIG. 1, the related art LCD device includes transparent lower and upper substrates 12 and 22 spaced apart from and facing each other. The LCD device further includes a liquid crystal layer 30 interposed therebetween.

Gate and data lines 14 and 16 are formed on an inner surface of the lower substrate 12 and cross each other to define pixel regions P. A thin film transistor T is formed at each crossing point of the gate and data lines 14 and 16. The thin film transistor T is connected to a pixel electrode 18 at each pixel region P.

A black matrix 25 is formed on an inner surface of the upper substrate 22 that faces the lower substrate. The black matrix 25 covers a non-display region, such as the gate lines 14, the data lines 16, and the thin film transistors T and has a lattice shape surrounding the pixel regions P. A color filter layer 26 is formed in each opening of the lattice of the black matrix 25. The color filter layer 26 includes red, green and blue color filter patterns 26a, 26b and 26c corresponding to the pixel regions P and sequentially and repeatedly arranged. A transparent common electrode 28 is formed on the black matrix 25 and the color filter layer 26.

The lower substrate 12 including the gate and data lines 14 and 16, the thin film transistors T and the pixel electrodes 18 may be referred to as an array substrate. The upper substrate 22 including the black matrix 25, the color filter layer 26 and the common electrode 28 may be referred to as a color filter substrate.

Although not shown in the figure, the array substrate and the color filter substrate are sealed by a sealant that is formed along peripheries of the two substrates to prevent the liquid crystal layer 30 from leaking. Lower and upper alignment layers are formed between the array substrate and the liquid crystal layer 30 and between the color filter substrate and the liquid crystal layer 30, respectively, and the lower and upper alignment layers determine an initial orientation of liquid crystal molecules. In addition, a polarizer is disposed on an outer surface of at least one of the substrates. Further, a backlight is disposed over the outer surface of the array substrate to provide light.

ON/OFF signals are sequentially applied to the gate lines 14, and an image signal is applied to the pixel electrode 18 in the selected pixel region P through the data line 16. An electric field perpendicular to the substrates is induced, and thus the liquid crystal molecules are driven by the electric field to thereby control light transmittance. Various images may be displayed by the varying light transmittance.

To improve viewing angles, an in-plane switching (IPS) LCD device has been proposed, in which the common electrode and the pixel electrode are formed on the same substrate. In the IPS LCD device, because the color filter substrate does not include the common electrode, the color filter substrate includes a black matrix, a color filter layer, and an overcoat layer. Moreover, to increase the brightness of the device and to more clearly produce the colors of the image, a four-sub pixel structure has been developed, wherein one pixel includes red, green, blue and white sub pixels.

FIG. 2 is a cross-sectional view of a color filter substrate for a related art LCD device having a four-sub pixel structure.

In FIG. 2, the color filter substrate further includes a white sub pixel. That is, red, green, blue and white color filter patterns 48a, 48b, 48c and 48d are formed on a substrate 41. The white color filter pattern 48d may be formed of a colorless transparent material. An overcoat layer 50 is formed on the red, green, blue and white color filter patterns 48a, 48b, 48c and 48d. The overcoat layer 50 has a flat surface. Patterned spacers 53 are formed on the overcoat layer 50 to keep the thickness of a liquid crystal layer (not shown) uniform.

FIGS. 3A to 3F are views illustrating a manufacturing method of a color filter substrate for an LCD device according to the related art.

In FIG. 3A, a black matrix 44 is formed on a transparent substrate 41 by applying or depositing a light-blocking material and patterning it by a mask process. The black matrix 44 includes first, second, third and fourth openings 46a, 46b, 46c and 46d and has a lattice shape.

In FIG. 3B, a red color filter layer (not shown) is formed on the black matrix 44 by applying photoresist including red pigments to substantially the entire surface of the substrate 41 and then by patterning the red color filter layer with a mask process to thereby form a red color filter pattern 48a in the first opening 46a. The red color filter pattern 48a partially overlaps the black matrix 44.

In FIG. 3C, a green color filter pattern 48b is formed in the second opening 46b by applying photoresist including green pigments to substantially the entire surface of the substrate 41 and then pattering it by a mask process. The green color filter pattern 48b partially overlaps the black matrix 44.

In FIG. 3D, a blue color filter pattern 48c is formed in the third opening 46c by the same process as the red and green color filter patterns 48a and 48b.

In FIG. 3E, a white color filter pattern 48d is formed in the fourth opening 46d by applying colorless transparent photoresist to substantially the entire surface of the substrate 41 and patterning it by a mask process. The red, green, blue and white color filter patterns 48a, 48b, 48c and 48d constitute a color filter layer.

In FIG. 3F, an overcoat layer 50 is formed on the red, green, blue and white color filter patterns 48a, 48b, 48c and 48d by applying a colorless transparent organic material. The overcoat layer 50 protects the red, green, blue and white color filter patterns 48a, 48b, 48c and 48d and flattens the steps of the red, green, blue and white color filter patterns 48a, 48b, 48c and 48d.

Next, patterned spacers 53 with column shapes are formed on the overcoat layer 50 by depositing a transparent organic material and patterning it with a mask process. The pattern spacers 53 have a thickness corresponding to a thickness of a liquid crystal layer (not shown), that is, a cell gap of an LCD device. The patterned spacers 53 are disposed over the black matrix 44 and spaced apart from each other.

In this manner, the related art color filter substrate having the four-sub pixel structure may be manufactured.

In order to manufacture the related art color filter substrate having the four-sub pixel structure, six mask processes are needed for patterning the black matrix 44, the red, green, blue and white color filter patterns 48a, 48b, 48c and 48d, and the patterned spacers 53. The mask process includes steps of light-exposing, developing, cleaning, etc. Therefore, the manufacturing processes and costs are increased, and the productivity is lowered as compared with a color filter substrate having only a three-sub pixel structure.

SUMMARY OF THE INVENTION

Accordingly, the present invention is directed to a manufacturing method of a color filter substrate that substantially obviates one or more of the problems due to limitations and disadvantages of the related art.

An advantage of the present invention is to provide a manufacturing method of a color filter substrate that has high production yield and low production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a manufacturing method of a color filter substrate includes forming a black matrix on a substrate, the black matrix including first, second, third and fourth openings, forming first, second and third color filter patterns in the first, second and third openings, forming an overcoat layer on the substrate including the first, second and third color filter patterns, disposing a soft mold on the overcoat layer, the soft mold including first depressed portions and a second depressed portion, the first depressed portions in a location corresponding to the black matrix, and the second depressed portion in a location corresponding to the fourth opening, wherein a first depth of the first depressed portions is larger than a second depth of the second depressed portion, applying pressure to the soft mold such that the first and second depressed portions are filled with the overcoat layer, the overcoat layer including a first part on the black matrix, a second part in the fourth opening, and a third part on the first, second and third color filter patterns, wherein the first part includes patterned spacers corresponding to the first depressed portions and having a first height and the second part includes a convex portion corresponding to the second depressed portion and having a second height, first curing the overcoat layer with the soft mold disposed thereon, detaching the soft mold from the overcoat layer, and second curing the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A to 3F are views illustrating a manufacturing method of a color filter substrate for an LCD device according to the related art;

FIGS. 4A to 4F are views illustrating a manufacturing method of a color filter substrate for an LCD device according to a first embodiment of the present invention;

FIG. 5A to FIG. 5C are views illustrating a fabricating method of a soft mold according to the first embodiment of the present invention;

FIG. 7A to FIG. 7E are views illustrating a fabricating method of a soft mold according to the second embodiment of the present invention.

DETAILED DESCRIPTION OF THE PREFERRED EMBODIMENTS

Figure 1:
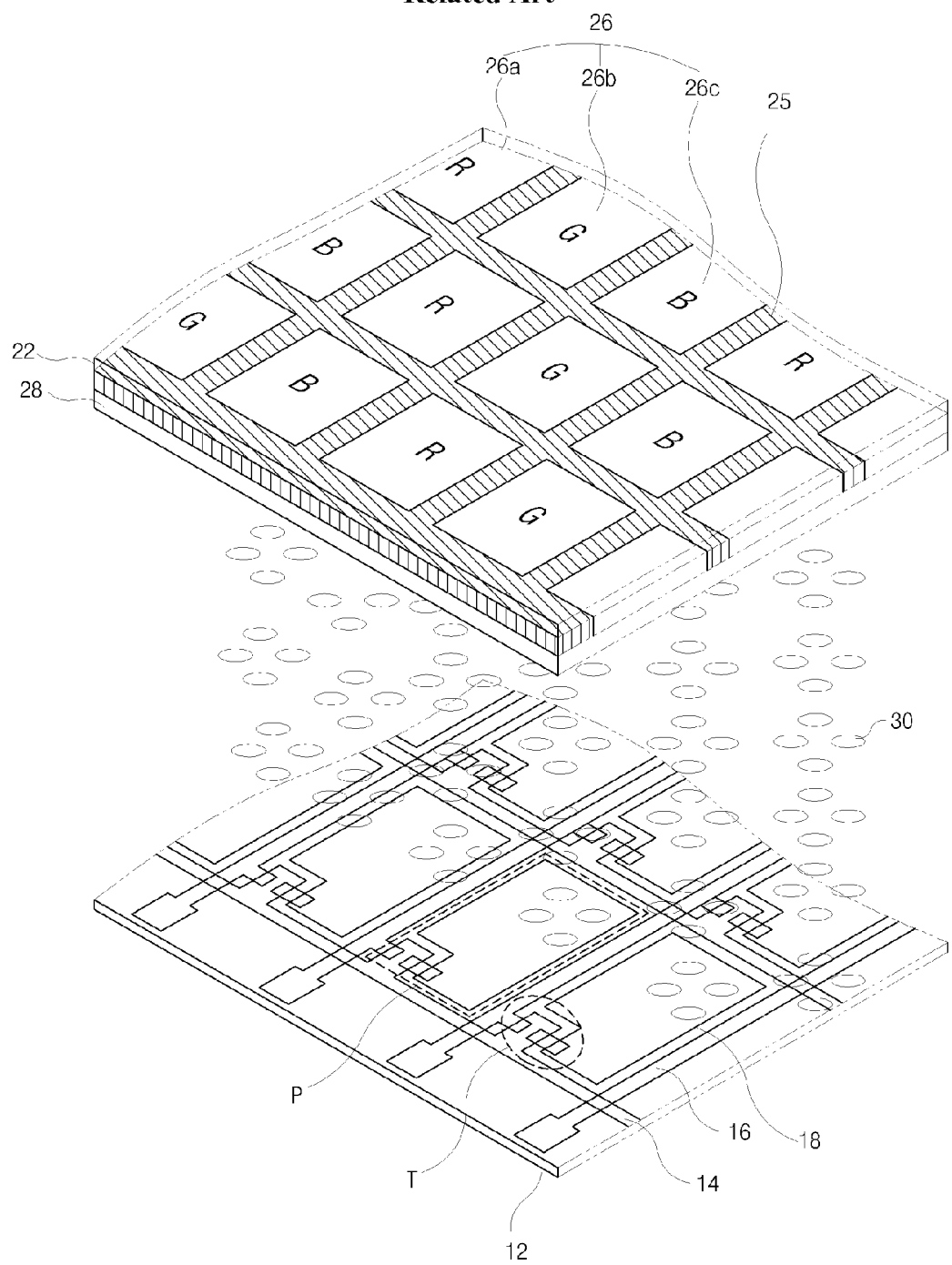
FIG. 1 is a perspective view illustrating a related art LCD device.
Figure 2:
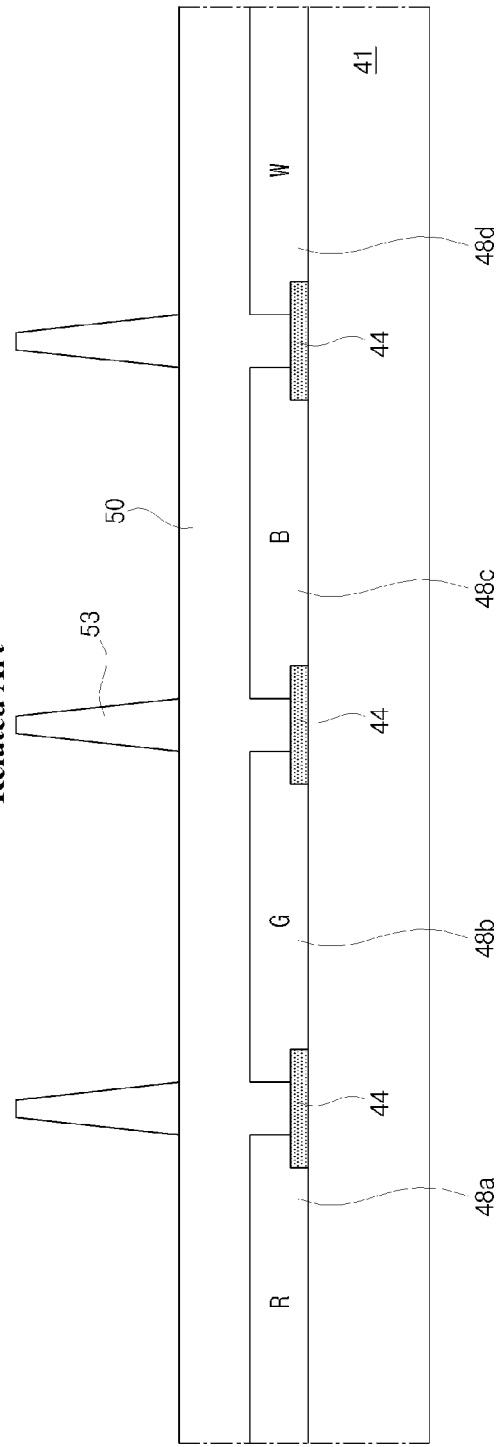
FIG. 2 is a cross-sectional view of a color filter substrate for a related art LCD device having a four-sub pixel structure.
Figure 3A:
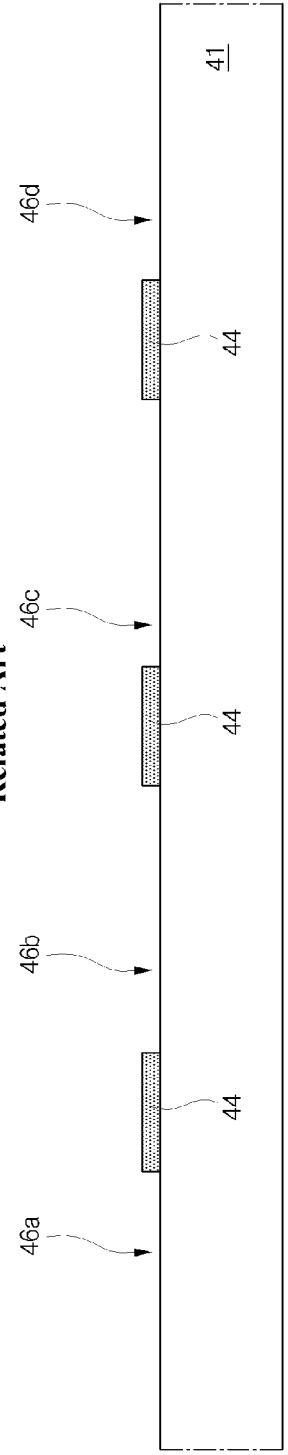
Figure 3F:
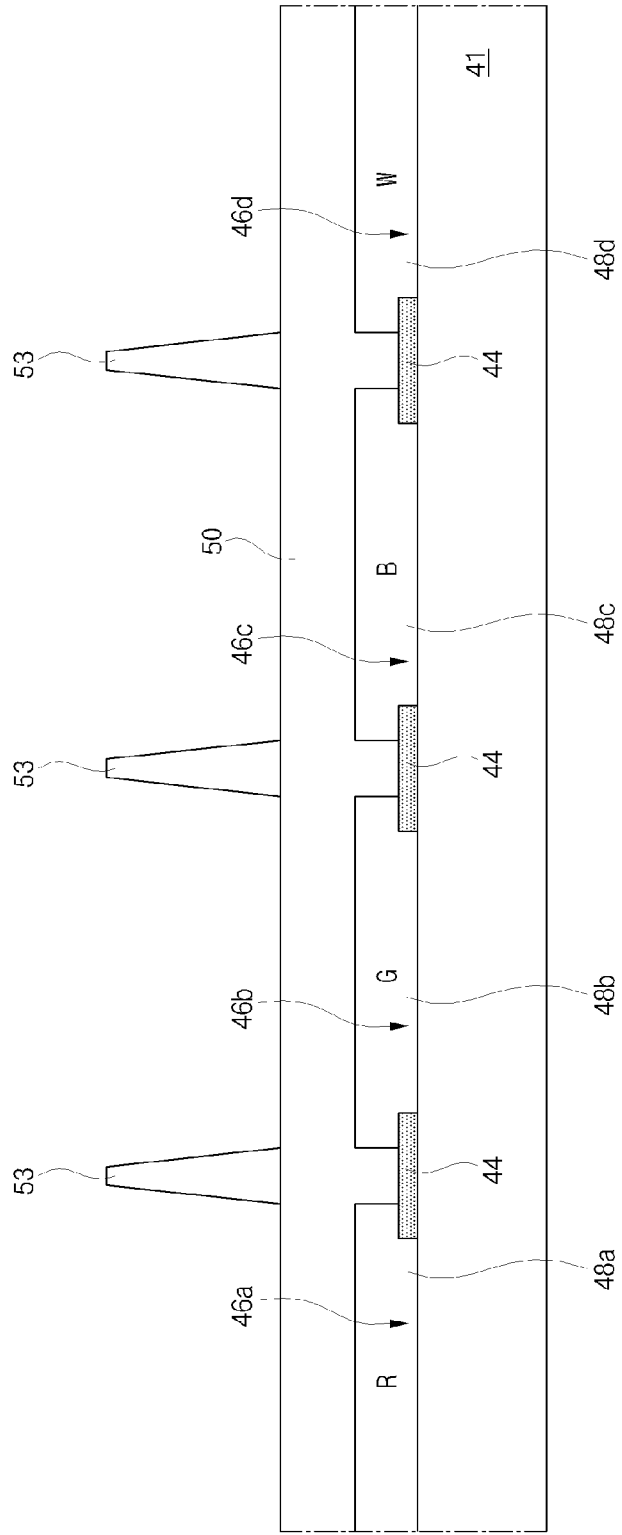

Reference will now be made in detail to embodiments of the present invention, examples of which are illustrated in the accompanying drawings.

FIGS. 4A to 4F are views illustrating a manufacturing method of a color filter substrate for an LCD device according to a first embodiment of the present invention. FIGS. 4A to 4F show a part of a color filter substrate according to the first embodiment of the present invention. The color filter substrate has a four-sub pixel structure.

In FIG. 4A, a black resin layer or a metallic layer is formed on a transparent insulating substrate 101 and then patterned by a first mask process to thereby form a black matrix 105. The black resin layer may be formed by applying a light-blocking material, for example, a black resin including carbon, to the substrate 101. The metallic layer may be formed by depositing chromium (Cr), and chromium oxide (CrOx) may be further deposited after depositing chromium (Cr). The black matrix 105 includes first, second, third and fourth openings 108a, 108b, 108c and 108d and has a lattice shape. The black matrix 105 exposes the substrate 101 through the first, second, third and fourth openings 108a, 108b, 108c and 108d.

When the black matrix 105 is made of black resin, the black matrix 105 may be formed only by a light-exposing process using a photo-mask and a developing process because the black resin has a photosensitive property. When the black matrix 105 is made of chromium (Cr), the black matrix 105 may be formed by depositing chromium to thereby form a metallic layer, applying photoresist to the metallic layer, exposing the applied photoresist to light, developing the light-exposed photoresist to thereby form a photoresist pattern, etching the metallic layer using the photoresist pattern, and then stripping the photoresist pattern.

The first, second, third and fourth openings 108a, 108b, 108c and 108d correspond to red, green, blue and white sub pixels, respectively, wherein the red, green, blue and white sub pixels constitute a pixel of a basic unit for displaying an image. The black matrix 105 corresponds to gate and data lines on an array substrate when a color filter substrate including the black matrix 105 is aligned with and attached to the array substrate.

In FIG. 4B, a first resist layer (not shown) is formed on the substrate 101 including the black matrix 105 by applying a first resist to the substrate 101. The first resist layer may have a photosensitive property and include red pigments, for example. The first resist layer is exposed to light and developed by a second mask process to thereby form a first color filter pattern 115a, for example, a red color filter pattern, in the first opening 108a. The first opening 108a is filled with the first color filter pattern 115a, and the first color filter pattern 115a partially overlaps the black matrix 105.

Figure 4C:
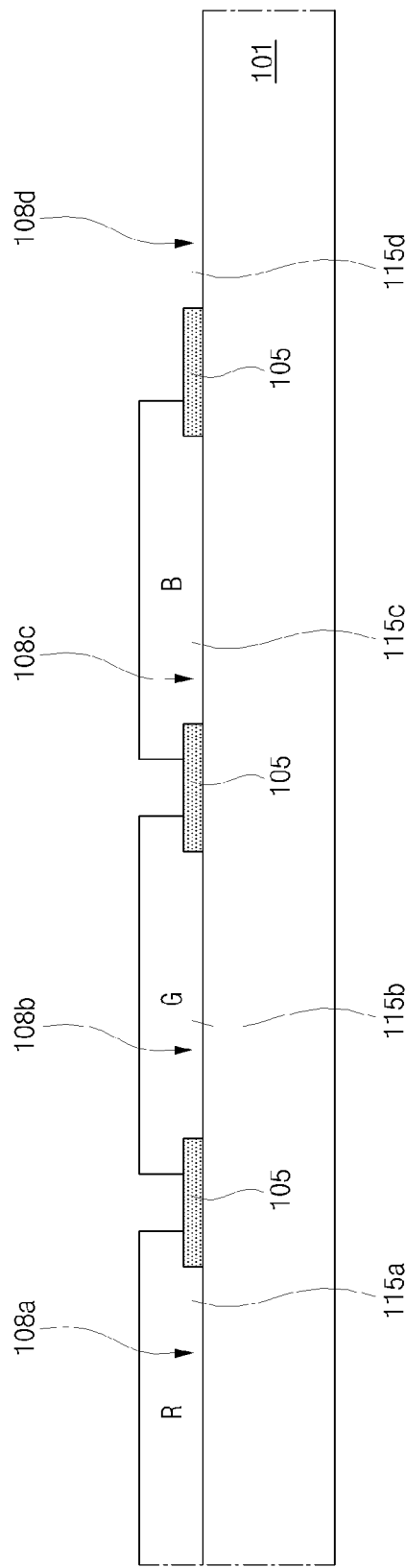

In FIG. 4C, like the first color filter pattern 115a, a second color filter pattern 115b and a third color filter pattern 115c are formed in the second and third openings 108b and 108c, respectively, by the same method as the first color filter pattern 115a. More particularly, the second color filter pattern 115b is formed by applying a second resist to the substrate 101 to thereby form a second resist layer and then exposing it to light and developing the second resist layer by a third mask process. The third color filter pattern 115c is formed by applying a third resist to the substrate 101 to thereby form a third resist layer and then exposing it to light and developing the third resist layer by a fourth mask process. The second resist layer may include green pigments, and the third resist layer may include blue pigments, for example. Therefore, the second color filter pattern 115b may be a green color filter, and the third color filter pattern 115c may be a blue color filter pattern. The second and third color filter patters 115b and 115c also partially overlap the black matrix 105.

Figure 4D:
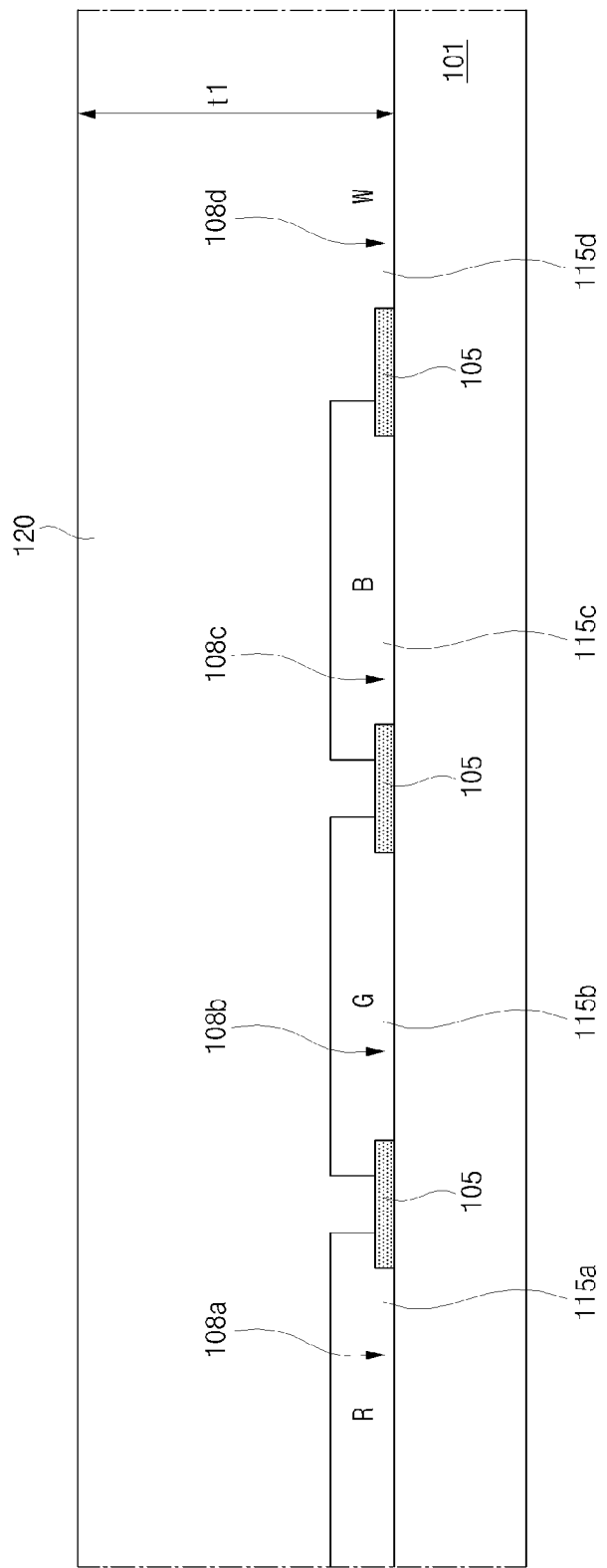

In FIG. 4D, an overcoat layer 120 is formed by applying organic insulating material to the substrate 101 including the first, second and third color filter patterns 115a, 115b and 115c. The organic insulating material is transparent and is curable by ultraviolet (UV) light. The organic insulating material may be selected from benzocyclobutene (BCB), photoacryl or photoresist. The overcoat layer 120 has a thickness such that its top surface is not affected by the steps of the black matrix 105 and the first, second and third color filter patterns 115a, 115b and 115c, and the overcoat layer 120 forms a level surface. Here, the fourth opening 108d is filled with the overcoat layer 120, and thus the part of the overcoat layer 120 in the fourth opening 108d may function as a fourth color filter pattern 115d, i.e., a white color filter pattern.

In the present invention, because the overcoat layer 120 is also used for forming patterned spacers (not shown), a first thickness t1 of the overcoat layer 120 may be thicker than that of a liquid crystal layer of an LCD device, that is, a cell gap. Generally, the cell gap may be within a range of 2 μm to 4 μm. The color filter patterns 115a, 115b and 115c may have a thickness of 1 μm to 1.5 μm. The overcoat layer 120 may have a minimum thickness of 0.5 μm when the color filer substrate is completed. Accordingly, the overcoat layer 120 may have the first thickness t1 more than 3.5 μm from a top surface of the substrate 101 by including the cell gap and the thicknesses of the color filter patterns and the completed overcoat layer. Beneficially, the first thickness t1 of the overcoat layer 120 may be within a range of 4 μm to 7 μm.

In FIG. 4E, a soft mold 160, which has depressed portions 163 corresponding to the black matrix 105, is disposed on the substrate 101 including the overcoat layer 120 such that the depressed portions 163 face the overcoat layer 120. Then, the soft mold 160 is pressed until the depressed portions 163 are completely filled with the overcoat layer 120. The depressed portions 163 may have a depth d1 equal to the cell gap. Next, the overcoat layer 120 is first cured by UV light.

In FIG. 4F, after first curing the overcoat layer 120, the soft mold 160 is detached from the cured overcoat layer 120. The overcoat layer 120 includes first, second and third parts. The first part of the overcoat layer 120 may be disposed on the black matrix, the second part of the overcoat layer 120 may be disposed in the fourth opening 108d, and the third part of the overcoat layer 120 may be disposed on the first, second and third color filter patterns 115a, 115b and 115c. An upper portion of the first part may correspond to the depressed portions 163 and may function as patterned spacers 125. The patterned spacers 125 have a height h1 equal to the depth d1 of the depressed portions 163, and thus the height h1 of the patterned spacers 125 equals to the cell gap. The patterned spacers 125 are spaced apart from each other and are disposed over the black matrix 105. The second part of the overcoat layer 120 may function as the fourth color filter pattern 115d. The first, second and third parts have first, second and third thicknesses t1, t2 and t3, respectively. The first thickness t1 substantially equals to the sum of the second thickness t2 and the height h1 of the patterned spacers 125.

For example, the height h1 of the patterned spacers 125 may be within a range of 2 μm to 4 μm. The second thickness t2 may be within a range of 1.5 μm to 3 μm.

Next, the overcoat layer 120 is second cured by heat, and the color filter substrate is completed.

In the first embodiment of the present invention, the color filter substrate having the red, green, blue and white color filter patterns is manufactured with a four mask processes. Thus, the manufacturing process is simplified as compared with the related art process, and the productivity is improved.

Meanwhile, the soft mold in the first embodiment of the present invention is a kind of a stamping mask including depressed portions or embossed portions. It is possible to form the depressed portions or embossed portions having various shapes or depths, heights or sizes within a range of several hundreds Å to several hundreds μm. The soft mold may be formed of an organic material, for example, polydimethylsiloxane (PDMS), silicon rubber, polyurethane or polyimide.

In the present invention, the overcoat layer having different thicknesses may be formed by applying pressure thereto using the soft mold that includes depressed portions or embossed portions.

Figure 5A:
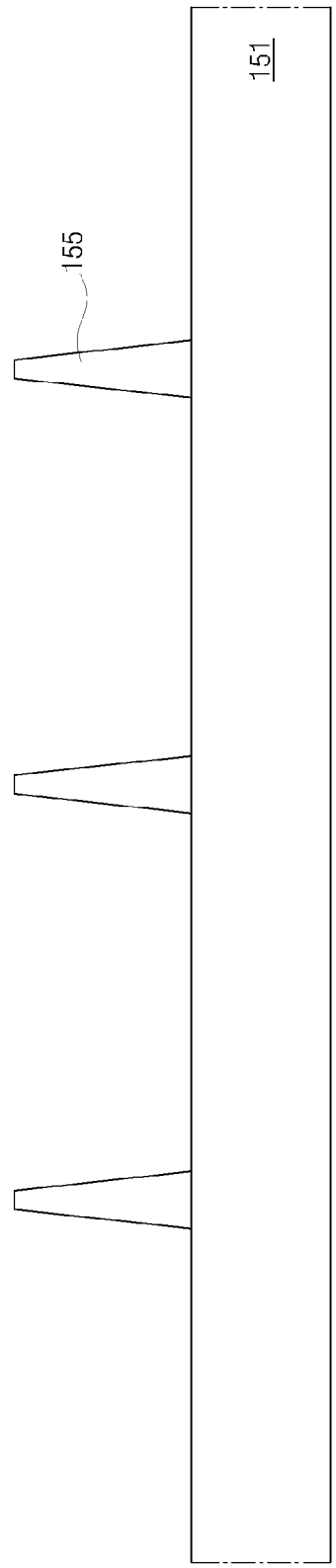
Figure 5B:
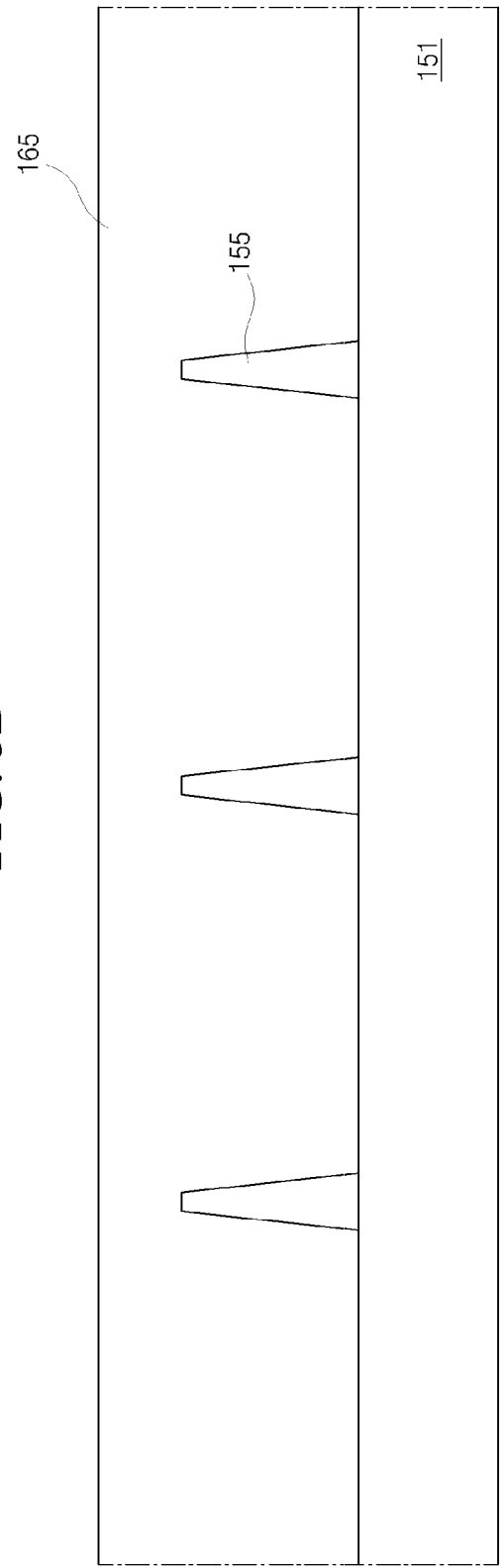

A method of fabricating the soft mold will be described hereinafter with reference to FIG. 5A to FIG. 5C. FIG. 5A to FIG. 5C are views illustrating a fabricating method of a soft mold according to the first embodiment of the present invention.

In FIG. 5A, embossed portions 155 may be formed on a base substrate 151, which has a flat surface, by depositing an inorganic material to thereby form a inorganic material layer, applying photoresist to the inorganic material layer, forming a photoresist pattern by light-exposing and developing processes, and then patterning the inorganic material layer using the photoresist pattern. The base substrate 151 may be a glass substrate or a metallic substrate. The inorganic material layer may be formed of silicon oxide ($SiO_2$) or silicon nitride (SiNx) and may have a thickness corresponding to the cell gap of the LCD device, that is, 2 μm to 4 μm. The embossed portions 155 may have a column shape and may be spaced apart from each other. Because the embossed portions 155 are used for forming depressed portions of a soft mold, the embossed portions 155 may have heights considering depths of the depressed portions. The base substrate 151 including the embossed portions 155 thereon may be referred to as a master plate.

In the meantime, the embossed portions 155 may be formed of photoresist. More particularly, a photoresist layer may be formed by applying photoresist to the base substrate 151. The photoresist layer may be exposed to light through a photo mask and then developed to thereby form the embossed portions 155. When the photoresist layer is a negative type, parts of the photoresist layer for the embossed portions 155 may correspond to a light-transmitting portion of the photo mask, the other parts of the photoresist layer may correspond to a light-blocking portion of the photo mask. Accordingly, the other parts of the photoresist layer that are not exposed to light may be removed after developing the photoresist layer, and the parts of the photoresist layer that are exposed to light may remain and become the embossed portions 155. This can further improve the productivity because an etching process for patterning the inorganic material layer and a stripping process for removing the photoresist pattern may be omitted.

In FIG. 5B, an organic material layer 165 is formed on the base substrate 151 including the embossing portions 155 such that the organic material layer 165 completely covers the embossing portions 155. The organic material layer 165 may be selected from one of polydimethylsiloxane (PDMS), silicon rubber, polyurethane or polyimide. The organic material layer 165 may be cured under a room temperature or a predetermined temperature for a predetermined time.

In FIG. 5C, the cured organic material layer 165 of FIG. 5B may be detached from the base substrate 151 including the embossed portions 155, thereby fabricating a soft mold 160. The soft mold 160 substantially has a thickness t4 and includes depressed portions 163, which correspond to the embossed portions 155 and have a depth d1. The soft mold 160 may be used semipermanently.

In the present invention, a mask process is needed to fabricate a soft mold, but patterned spacers of each of color filter substrates can be formed by the soft mold. Therefore, even though a hundred color filter substrates are manufactured, only one mask process is required to completely form patterned spacers on each on the color filter substrates. On the other hand, in the related art, because a mask process is needed to form patterned spacers on each of the color filter substrates, a hundred mask processes are required.

Accordingly, by forming the patterned spacers with the soft mold, the productivity of manufacturing a color filter substrate may be improved.

As stated above, the overcoat layer including the patterned spacers is cured by heating the color filter substrate of the present invention. The overcoat layer may shrink during curing. As a result, the second part of the overcoat layer, that is disposed in the fourth opening 108d, may shrink more than the third part of the overcoat layer, which is disposed on the color filter patterns, because the second part is thicker than the third part. Therefore, the surface of the second part may be lower than that of the third part. This may cause a non-uniform cell gap.

To improve the uniformity of the cell gap, in a second embodiment of the present invention, a soft mold having a different structure from that of the first embodiment is used for forming the overcoat layer.

Figure 6:
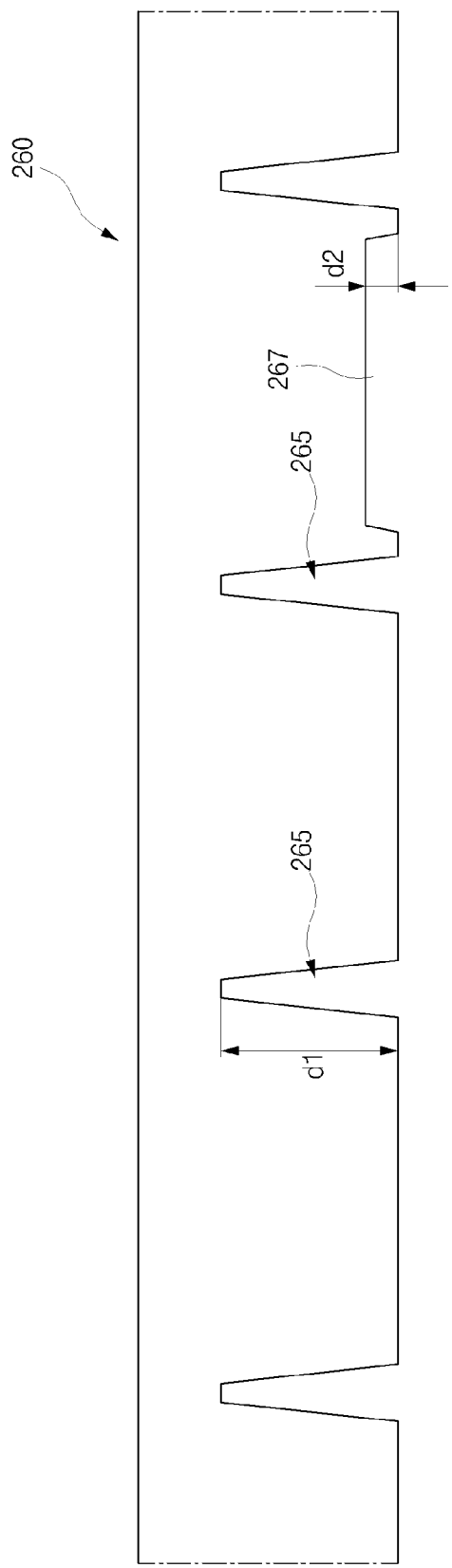
FIG. 6 is a cross-sectional view of a soft mold according to the second embodiment of the present invention.

FIG. 6 is a cross-sectional view of a soft mold according to the second embodiment of the present invention.

In FIG. 6, the soft mold includes first depressed portions 265 and a second depressed portion 267 on the same side. The first depressed portions 265 correspond to patterned spacers of a color filter substrate and have a first depth d1. The second depressed portion 267 corresponds to a white color filter pattern of the color filter substrate and has a second depth d2. The first depth d1 is larger than the second depth d2.

FIG. 7A to FIG. 7E are views of illustrating a fabricating method of a soft mold according to the second embodiment of the present invention.

Figure 7A:
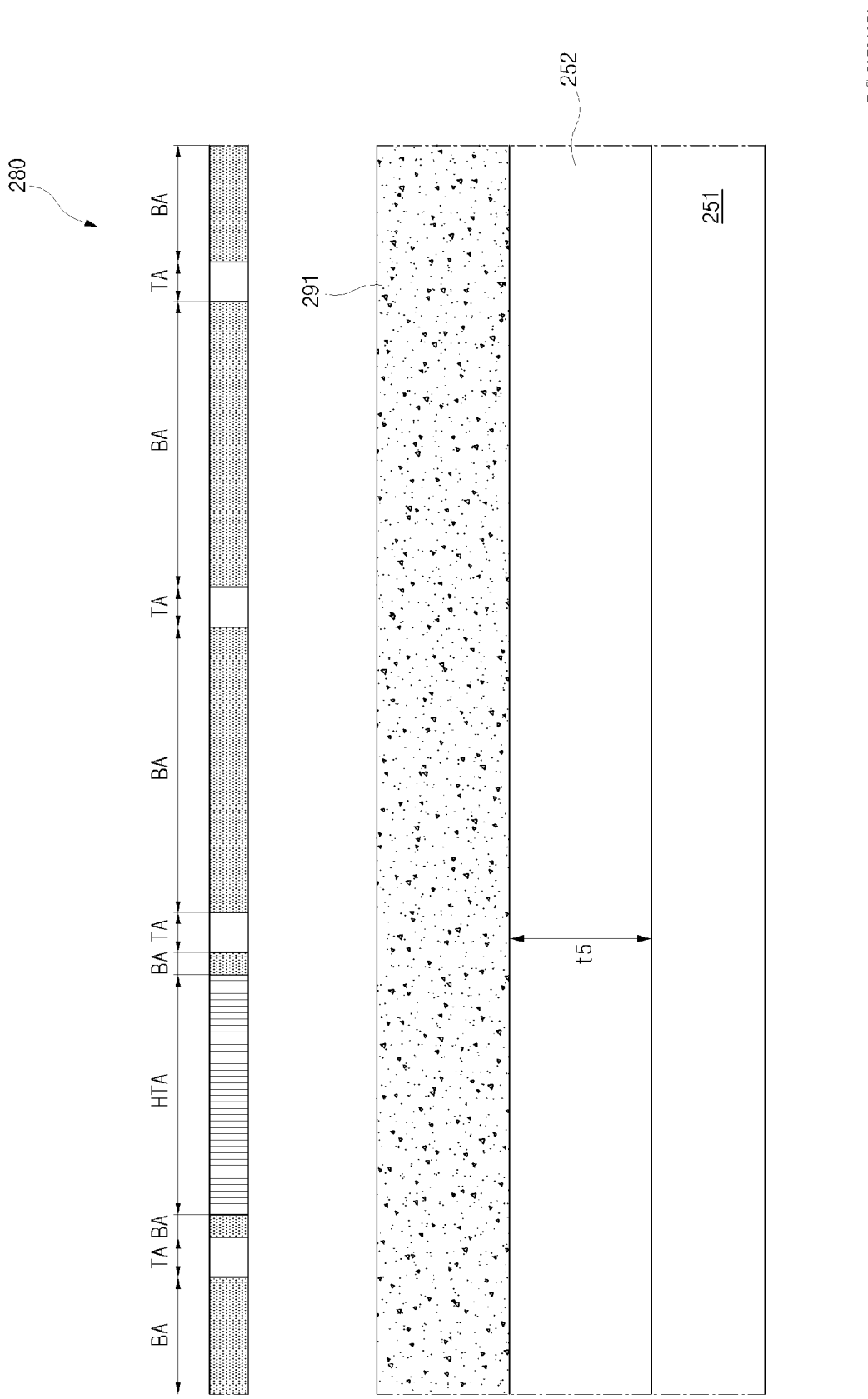

In FIG. 7A, an inorganic material layer 252 may be formed on a base substrate 251, and a photoresist layer 291 is formed on the inorganic material layer 252 by applying photoresist to the base substrate 251. The base substrate 251 may be formed of glass or metal. The inorganic material layer 252 may have a first thickness t5 corresponding to a cell gap of an LCD device.

Next, a mask 280 is disposed over the photoresist layer 291, and the photoresist layer 291 is exposed to light through the mask 280. The mask 280 includes a light-transmitting portion TA, a light-blocking portion BA and a light-half transmitting portion HTA.

In FIG. 7B, the photoresist layer 291 of FIG. 7A is developed, thereby forming first photoresist patterns 291a and a second photoresist pattern 291b. The first photoresist patterns 291a have a second thickness t6, and the second photoresist pattern has a third thickness t7. The second thickness t6 is larger than the third thickness t7. Then, the inorganic material layer 252 of FIG. 7A is first etched by using the first and second photoresist patterns 291a and 291b as an etching mask to thereby expose the base substrate 251 and form first inorganic material patterns 254 and a second inorganic material pattern 253. It is desirable that the inorganic material layer 252 is anisotropically dry-etched. In an anisotropic dry-etching method, the etching proceeds exclusively in a vertical direction with respect to the base substrate 251. Because the inorganic material layer 252 is thick, even though the first and second photoresist patterns 291a and 291b cover the first and second inorganic material patterns 254 and 253, respectively, upper parts of the first and second inorganic material patterns 254 and 253 that are far from the base substrate 251, may be more exposed to gases or plasma than lower parts of the first and second inorganic material patterns 254 and 253. Therefore, the first and second inorganic material patterns 254 and 253 have tapered sides such that the upper parts of the first and second inorganic material patterns 254 and 253 have narrower widths than the lower parts of the first and second inorganic material patterns 254 and 253.

In FIG. 7C, the second photoresist pattern 291b of FIG. 7B is removed by an ashing process to thereby expose the second inorganic material pattern 253 of FIG. 7B. The first inorganic material patterns 254 of FIG. 7B become first embossed portions 255. Next, second anisotropic dry-etching is performed, and the second inorganic material pattern 253 is partially etched to thereby form a second embossed portion 257. The first embossed portions 255 have the first thickness t5, and the second embossed portion 257 has a fourth thickness t8, which is smaller than the first thickness t5.

Figure 7D:
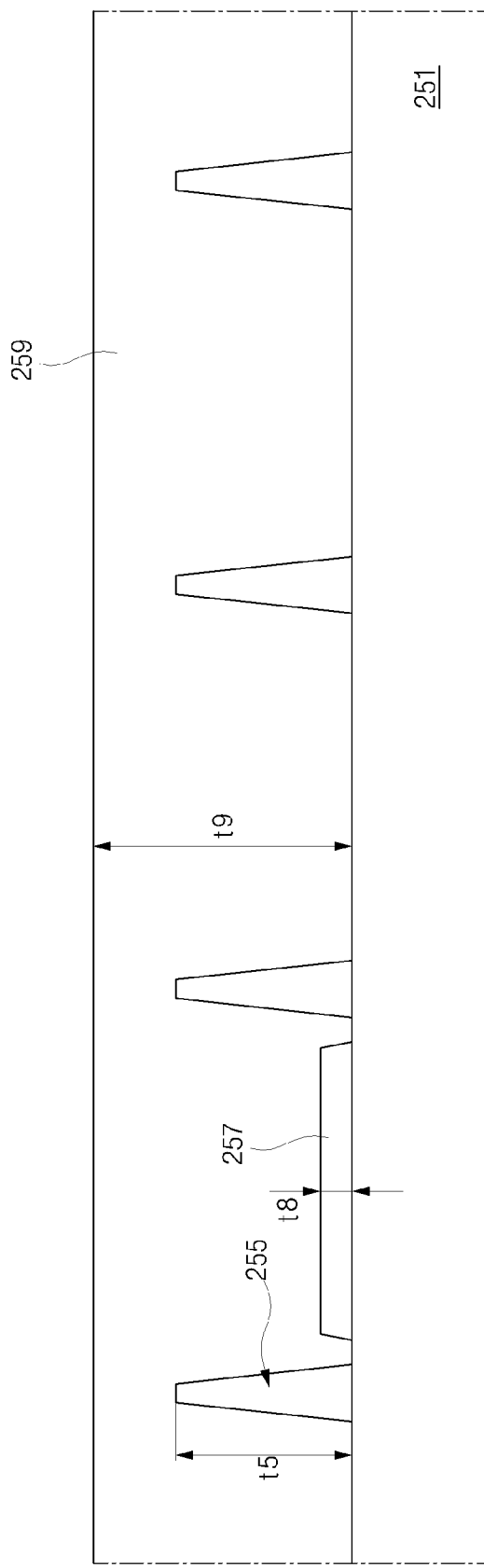

In FIG. 7D, the first photoresist patterns 291a of FIG. 7C are stripped. The base substrate 251 including the first and second embossed portions 255 and 257 may be referred to as a master plate. Next, a transparent organic material layer 259 is formed on the base substrate 251 including the first and second embossed portions 255 and 257 by applying an organic material to the base substrate 251. The organic material layer 259 has a fifth thickness t9 to completely cover the first and second embossed portions 255 and 257. The organic material may be polydimethylsiloxane (PDMS), silicon rubber, polyurethane or polyimide. The organic material layer 259 may be cured under room temperature or a predetermined temperature for a predetermined time.

Figure 7E:
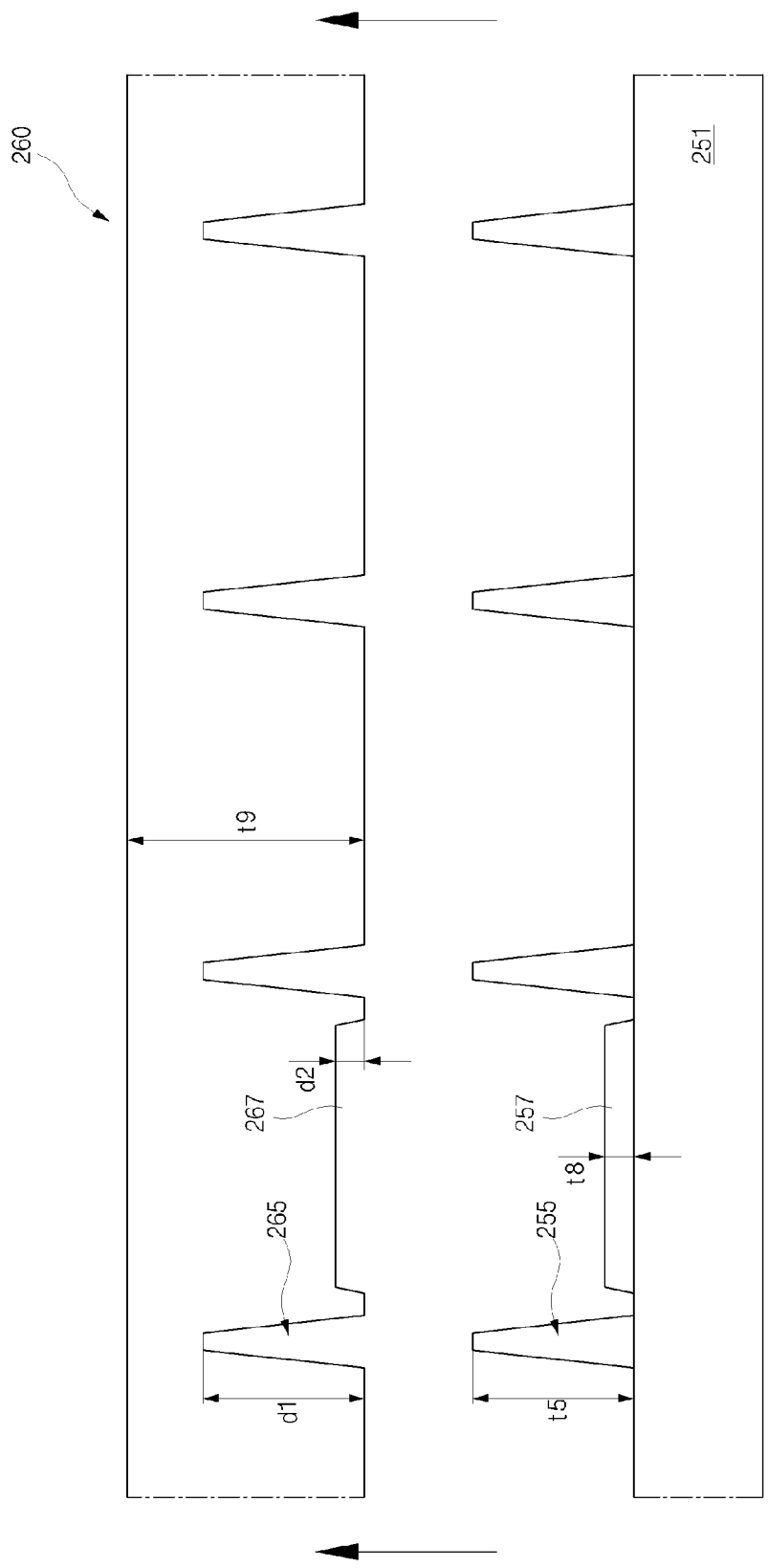

In FIG. 7E, the cured organic material layer 259 of FIG. 7D may be detached from the base substrate 251 including the first and second embossed portions 255 and 257, thereby fabricating a soft mold 260. The soft mold 260 substantially has the fifth thickness t9 and includes first depressed portions 265 and a second depressed portion 267. The first depressed portions 265 correspond to the first embossed portions 255 and have a first depth d1. The second depressed portion 267 corresponds to the second embossed portion 257 and has a second depth d2 that is smaller than the first depth d1.

In the second embodiment of the present invention, even though the first and second embossed portions are formed of an inorganic material, photoresist may be used for the first and second embossed portions as explained in the first embodiment, and thus the productivity may be improved. That is, a photoresist layer is formed by applying photoresist to the base substrate, exposed to light through a mask that includes a light-transmitting portion, a light-blocking portion and a light-half transmitting portion, and then developed to thereby form first and second embossed portions on the base substrate. Next, a soft mold that includes first and second depressed portions having different depths may be fabricated by the processes described in FIGS. 7D and 7E.

A color filter substrate according to the second embodiment of the present invention may be manufactured using the soft mold fabricated by the processes of FIGS. 7A to 7E. A manufacturing method of a color filter substrate according to the second embodiment of the present invention will be described hereinafter.

Figure 8A:
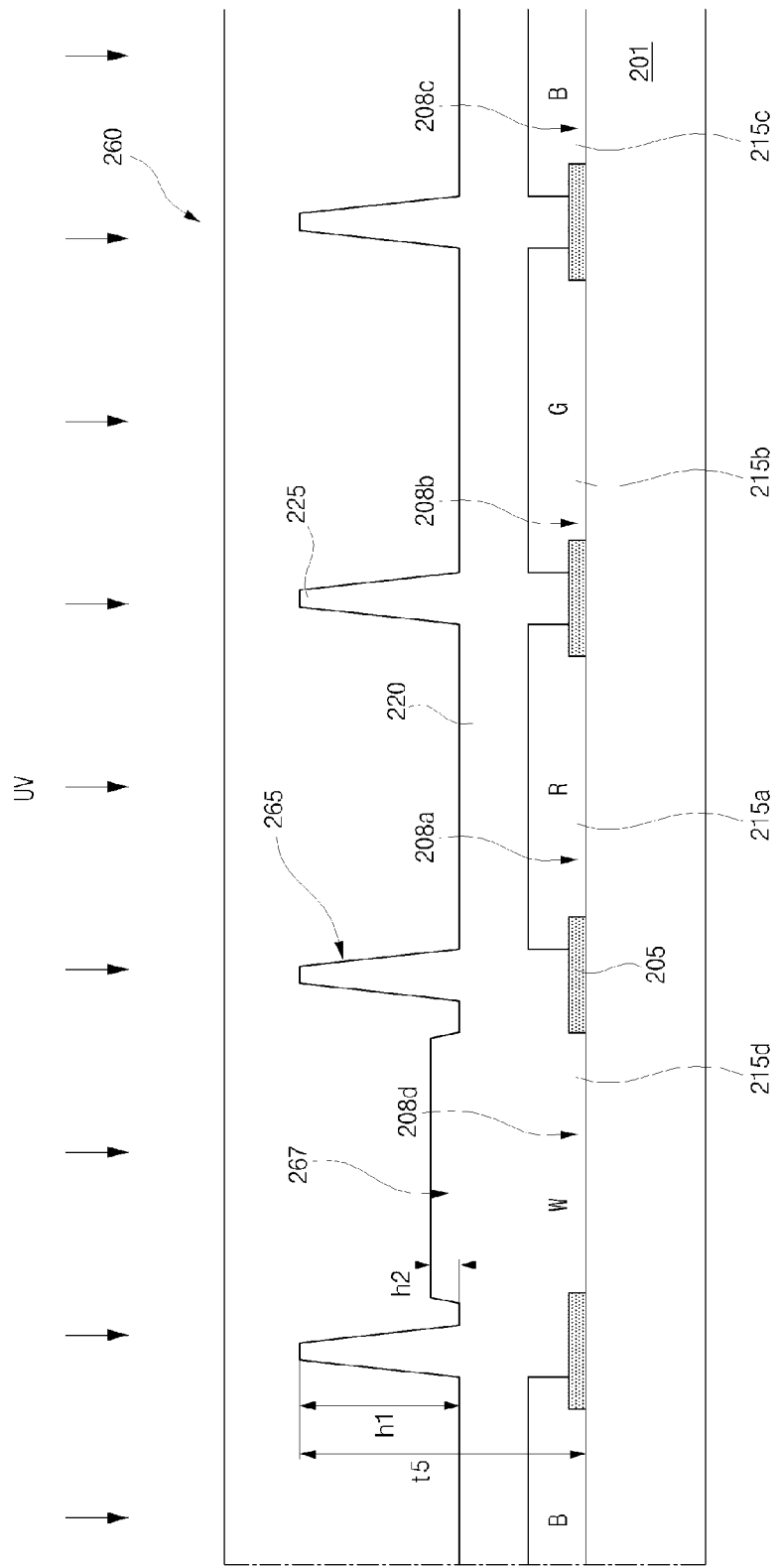
FIGS. 8A to 8C are views illustrating a manufacturing method of a color filter substrate for an LCD device according to the second embodiment of the present invention.
Figure 8B:
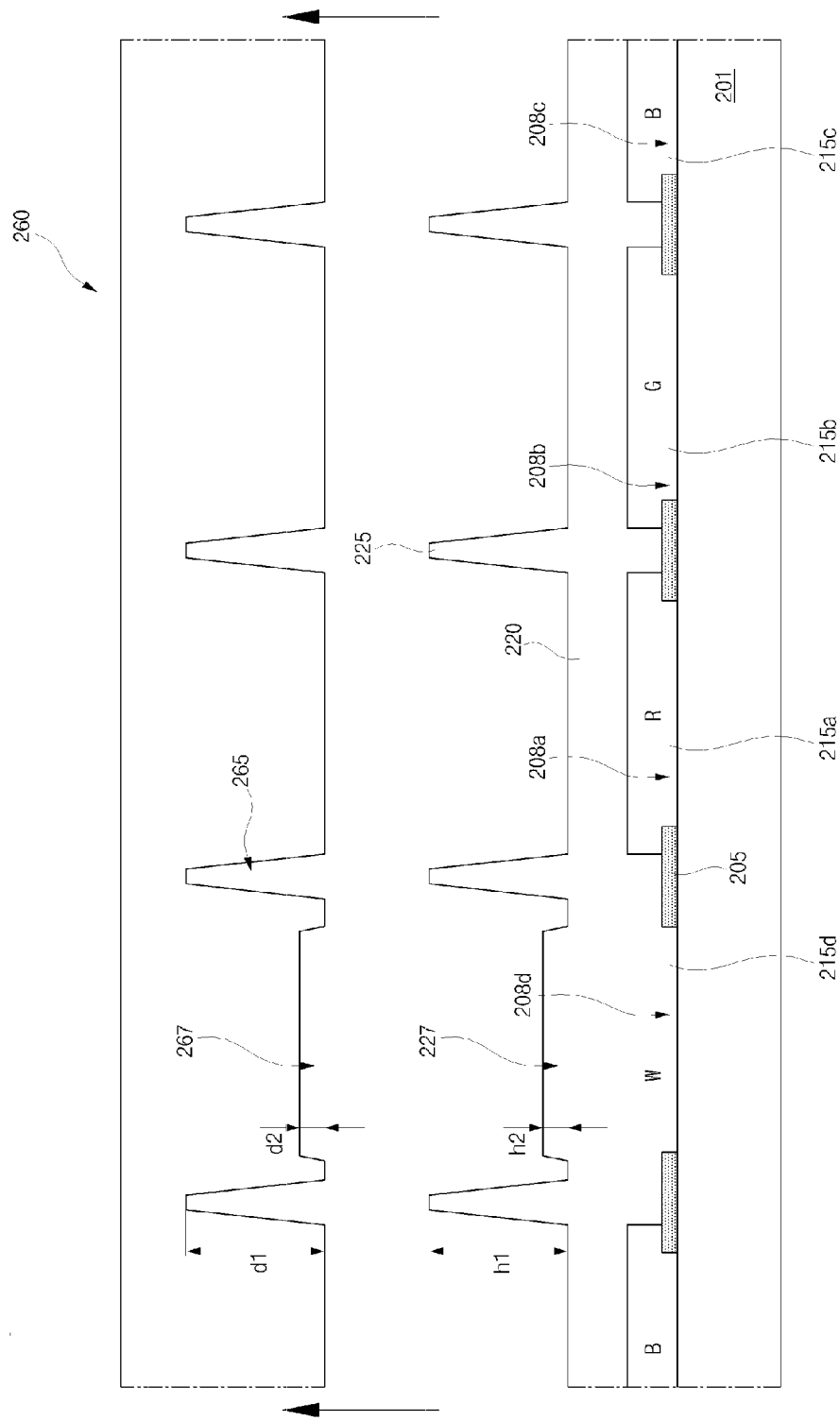
Figure 8C:
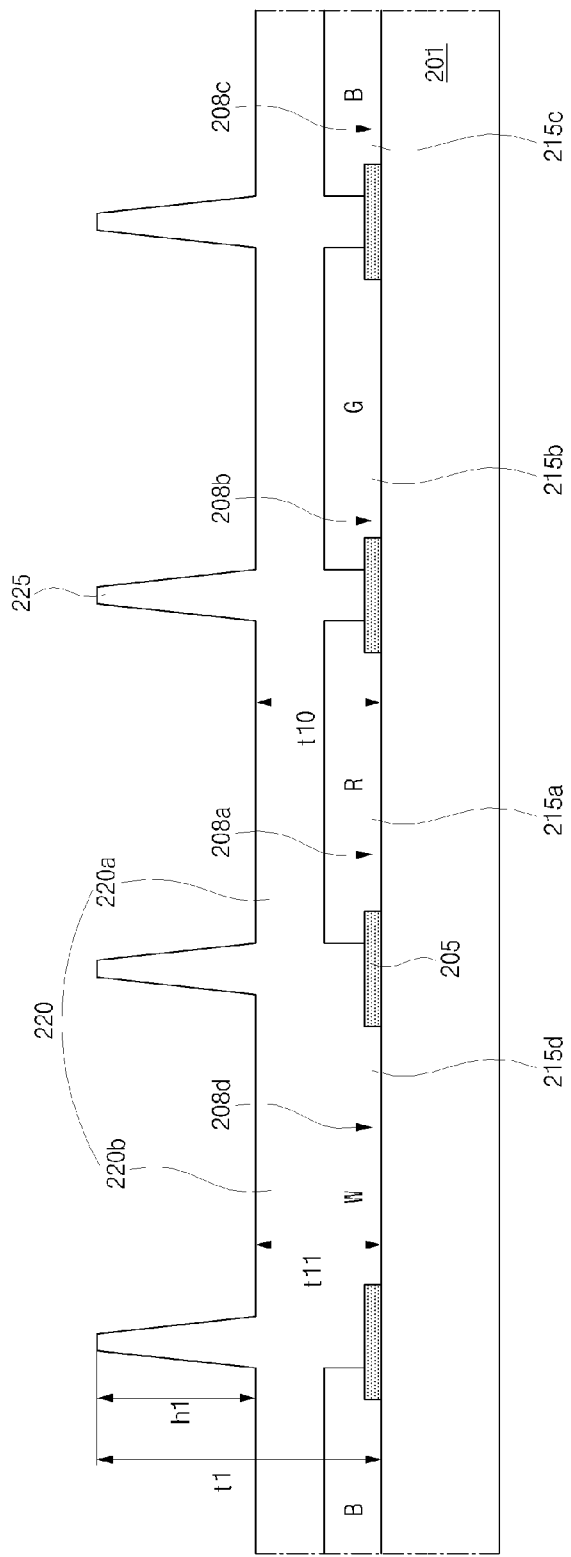

FIGS. 8A to 8C are views illustrating a manufacturing method of a color filter substrate for an LCD device according to the second embodiment of the present invention. The manufacturing method of the color filter substrate according to the second embodiment includes the same processes as those illustrated in FIGS. 4A to 4D. Thus, drawings and explanations for the same processes will be omitted or abbreviated.

In FIG. 8A, a black matrix 205 is formed on a substrate 201. The black matrix 205 has first, second, third and fourth openings 208a, 208b, 208c and 208d. First, second and third color filter patterns 215a, 215b and 215c are formed in the first, second and third openings 208a, 208b and 208c, respectively. For example, the first, second and third color filter patterns 215a, 215b and 215c may be red, green and blue, respectively.

An overcoat layer 220 is applied to the substrate 201 including the first, second and third color filter patterns 215a, 215b and 215c, and then a soft mold 260 is disposed and pressed on the overcoat layer 220 until first and second depressed portions 265 and 267 of the soft mold 260 are completely filled with the overcoat layer 220. The overcoat layer 220 may have a first thickness t1 within a range of 4 µm to 7 µm from a top surface of the substrate 201. The first depressed portions 265 have a greater depth than the second depressed portion 267, and the depth of the first depressed portions 265 substantially equals to a cell gap of an LCD device. The first depressed portions 265 correspond to the black matrix 205, and the second depressed portion 267 corresponds to the fourth opening 208d. The fourth opening 208d is filled with the overcoat layer 220, and thus the part of the overcoat layer 220 in the fourth opening 208d may function as a fourth color filter pattern 215d, for example, a white color filter pattern. Next, the overcoat layer 220 is first cured by irradiating UV light thereto through the soft mold 260.

In FIG. 8B, the soft mold 260 is detached from the overcoat layer 220 first cured by UV light. The overcoat layer 220 includes first, second and third parts. The first part of the overcoat layer 220 may be disposed on the black matrix, the second part of the overcoat layer 220 may be disposed in the fourth opening 208d, and the third part of the overcoat layer 220 may be disposed on the first, second and third color filter patterns 215a, 215b and 215c. An upper portion of the first part may correspond to the first depressed portions 265 of the soft mold 260 and may function as patterned spacers 225. The patterned spacers 225 may have a first height h1 equal to the depth of the first depressed portions 265, and thus the first height h1 of the patterned spacers 225 may equal to the cell gap. The patterned spacers 225 are spaced apart from each other are disposed over the black matrix 205. The second part of the overcoat layer 220 may function as the fourth color filter pattern 215d. The second part of the overcoat layer 220 may have a convex portion corresponding to the second depressed portion 267, and the convex portion may have a second height h2 equal to the depth of the second depressed portion 267 of the soft mold 260. The second height h2 of the convex portion of the second part of the overcoat layer 220 may be determined by considering contraction of the overcoat layer 220 after heat-treatment.

In FIG. 8C, the overcoat layer 220 is then cured by heat, and the color filter substrate is completed. The overcoat layer 220 may shrink due to the heat, and a total thickness is decreased. The second part of the overcoat layer 220 having the convex portion may shrink more than the third part of the overcoat layer 220 on the first, second and third color filter patterns 215a, 215b and 215c because the second part is thicker than the third part.

Finally, a first distance t10 from the substrate 201 to a top surface of the second part is substantially the same as a second distance t11 from the substrate 201 to a top surface of the third part. Accordingly, the overcoat layer 220 may have substantially a flat surface all over except for where the part of the patterned spacers 225 are located.

Meanwhile, it is desirable that the depth of the first depressed portions of the soft mold may be larger than the cell gap by considering the contraction of the overcoat layer during heating.

Generally, the overcoat layer may shrink by 3 to 5% from its original thickness. The patterned spacers may have a thickness of about 3.15 µm before the heat-treatment, so that the cell gap may be about 3 µm, the first, second and third color filter patterns may have a thickness of about 1 µm, and the original thickness of the overcoat layer may be 4.5 µm to 5 µm from the substrate, and the overcoat layer may shrink by 5%.

Meanwhile, the second part of the overcoat layer except for the convex portion may have substantially a thickness of 1.35 µm to 1.85 µm that corresponds to the original thickness of the overcoat layer minus the thickness of the patterned spacers before the heat-treatment. In addition, the third part of the overcoat layer on the color filter patterns may have a thickness of 0.35 µm to 0.85 µm. At this time, because the difference between thicknesses of the second and third parts of the overcoat layer is 1 µm, the convex portion of the second part of the overcoat layer may have a thickness of about 0.05 µm by considering a contraction of 5%.

Accordingly, the patterned spacers may have the thickness of about 3.15 µm, the third part of the overcoat layer may have the thickness of 0.35 µm to 0.85 µm, and the second part of the overcoat layer including the convex portion may have the thickness of 1.4 µm to 1.9 µm. Moreover, in the soft mold, the first depressed portions may have the first depth of 3.15 µm that is 5% more than the cell gap of 3 μm, and the second depressed portion may have the second depth of 0.05 μm.

In the present invention, because the overcoat layer may function as a white color filter pattern, an additional mask process is not needed. In addition, the overcoat layer may be patterned by a soft mold to thereby form patterned spacers. Accordingly, the manufacturing processes may be decreased, and the productivity may be improved. Further, the display brightness may be increased due to the white color filter pattern.

It will be apparent to those skilled in the art that various modifications and variations can be made in the color filter substrate for an LCD device and manufacturing method thereof of the present invention without departing from the spirit or scope of the invention. Thus, it is intended that the present invention cover the modifications and variations of this invention provided they come within the scope of the appended claims and their equivalents.

What is claimed is:

1. A soft mold for manufacturing a color filter substrate, which includes a black matrix and first, second, third and fourth color filter patterns, comprising:
    first depressed portions in locations corresponding to the black matrix and having a first depth, the first depressed portions including first to fourth sub-depressed portions; and
    a second depressed portion between the first and second sub-depressed portions of the first depressed portions in a location corresponding to the fourth color filter pattern and having a second depth and substantially flat surfaces between the second and third sub-depressed portions of the first depressed portions and the third to fourth sub-depressed portions of the first depressed portions,
    wherein the first depth is larger than the second depth,
    wherein a width of each first depressed portion is smaller than a width of the second depressed portion,
    wherein the second depressed portion is spaced apart from the first depressed portions, and
    wherein a group of the first to fourth sub-depressed portions of the first depressed portions and the second depressed portion between the first and second sub-depressed portions is sequentially and repeatedly arranged on a surface of the soft mold.

2. The soft mold according to claim 1, wherein the color filter substrate further includes patterned spacers over the black matrix, and the first depressed portions correspond to the patterned spacers.

3. The soft mold according to claim 2, wherein the patterned spacers have a height smaller than the first depth.

4. The soft mold according to claim 3, wherein the height of the patterned spacers is within a range of 2 μm to 4 μm.

5. The soft mold according to claim 2, wherein the first, second, third and fourth color filter patterns correspond to red, green, blue and white color filter patterns, respectively.

6. The soft mold according to claim 5, wherein the patterned spacers and the white color filter pattern are formed of the same material in the same process.

7. The soft mold according to claim 1, wherein the second depressed portion is disposed directly in an area where a white color filter pattern is formed.

* * * * *